United States Patent [19]

Baumgardt et al.

[11] 4,233,203

[45] Nov. 11, 1980

[54] MOLDABLE THERMOSETTING PHENOL-ALDEHYDE RESIN COMPOSITIONS AND PROCESS FOR MAKING THE COMPOSITIONS

[75] Inventors: Walter G. Baumgardt, Tonawanda; John J. Ondesko, North Tonawanda; Bernard K. Zysman, Snyder, all of N.Y.

[73] Assignee: Hooker Chemicals & Plastics Corp., Niagara Falls, N.Y.

[21] Appl. No.: 863,552

[22] Filed: Dec. 22, 1977

[51] Int. Cl.² ............................ C08K 3/22; C08K 3/36
[52] U.S. Cl. ....................................................... 260/38
[58] Field of Search ........................................... 260/38

[56] References Cited

U.S. PATENT DOCUMENTS

| | | | |
|---|---|---|---|
| 3,567,667 | 3/1971 | Rumbold | 260/17.2 |
| 3,651,008 | 3/1972 | Moser et al. | 260/38 X |
| 3,658,748 | 4/1972 | Andersen et al. | 260/38 X |
| 3,922,241 | 11/1975 | Barker et al. | 260/38 X |

FOREIGN PATENT DOCUMENTS

| | | |
|---|---|---|
| 562310 | 6/1944 | United Kingdom . |
| 762272 | 11/1956 | United Kingdom . |
| 1225037 | 3/1971 | United Kingdom . |
| 1225175 | 3/1971 | United Kingdom . |
| 1408568 | 10/1975 | United Kingdom . |

OTHER PUBLICATIONS

"Processed Mineral Fiber Reinforces Thermoplastics, Thermosets", *Plastics Technology*, (Apr., 1977), p. 21.
Jim Walters Co., Coal, Iron & Chemicals Group, "Mineral Fiber", (Oct. 14, 1975), 4 pages.
Conroy et al., "Processed Mineral Fiber . . . ", *Plastics Engineering*, (Aug. 1977), pp. 28-30.

*Primary Examiner*—Sandra M. Person
*Attorney, Agent, or Firm*—Peter F. Casella; James F. Mudd

[57] ABSTRACT

Molding compositions containing a phenol-aldehyde resin, a filler material and processed mineral fiber as a processing aid are described. The compositions are suited to be extruded and comminuted to produce a nodular product essentially uniform in size and useful in injection, transfer, and compression molding processes.

10 Claims, No Drawings

MOLDABLE THERMOSETTING PHENOL-ALDEHYDE RESIN COMPOSITIONS AND PROCESS FOR MAKING THE COMPOSITIONS

BACKGROUND OF THE INVENTION

The present invention relates to injection moldable phenolic resin compositions, preferably, in nodule, or pellet form and to a process for producing such compositions. The present compositions contain high percentages of filler materials.

Phenolic molding compositions have been available for many years. Generally, such compositions consist of a phenol-aldehyde resin blended with various filler materials. The molding compositions are prepared by blending a one- or two-stage phenol-aldehyde resin with filler material. In one method, the compositions were processed by working the mixture between hot rolls to soften the resin and to obtain a blend of the components. The composition is then cooled, crushed and screened. The product, while useful in some molding operations, was not generally uniform in size nor composition and has been found unsuited to the newer methods of molding thermosetting resin compositions. The newer molding methods are adapted to utilize a resin composition in the physical form of a nodule, or pellet. Such nodules are suitably produced by extrusion processes. The extruded products are usually cylindrical and generally range from about 1/16" to about ¼" in diameter and from about 1/16" to about ¼" in length, depending upon the use of the product. The extruded product has a higher density and is essentially uniform in size. Such characteristics are desirable for handling and shipping and are equally desirable for mold loading processes.

The phenol aldehyde resins may be made from phenols such as phenol, m-cresol, m,p-cresol mixtures, cresylic acid, mixtures of phenol and cresylic acid, xylenol, resorcinol, bisphenol A, or any other phenol which will form thermosetting resins with aldehydes. Suitable aldehydes, for example, are formaldehyde, acetaldehyde, benzaldehyde, furfural, propionaldehyde, glyoxal, acrolein and crotonaldehyde. Preferred thermosetting resin is phenolformaldehyde resin, and, more preferably, is a phenol-formaldehyde novolac which includes a crosslinking agent such as hexamethylenetetramine or paraformaldehyde.

Filler materials utilized in molding compositions may be organic or inorganic. Such materials are, primarily, added to enhance the properties of the final molded product and, secondarily, to utilize a less expensive material in place of the more expensive resin material. Examples of inorganic filler materials are metals, metal oxides, asbestos, silica, chopped fiberglass, calcium carbonate, minerals, e.g. wollastonite, talc, and quartz powders, clay, coal, mica, and carbon black. Examples of organic filler materials are rubber, wood flour, cloth fibers, rag pulp, wool and cotton flock. The characteristics of the final cured product, for example, electrical conductivity, moisture resistance, heat resistance and thermal expansion and conductivity, may be modified or improved by the choice and amounts of filler materials.

Although the choice of filler material is broad, the amount of filler material that may be included is limited, due to the increase in viscosity of the mixture as the amount of filler material is increased. Generally, a total filler content between about 20 and about 70 percent by weight of the composition is useful. The increase in viscosity is particularly noted in regard to increases in amounts of inorganic filler materials that are added. The practical limits of loading, i.e. the maximum amount of inorganic filler material that may be added, is usually limited to a maximum of about 40 to about 60 percent by weight. Compositions with amounts of inorganic filler materials above that range are extruded and molded with extreme difficulty. Many inorganic materials, particularly mineral powders, have an irregular particle size and tend to pack at higher loadings, over about 30 to about 40 percent by weight, and such compositions cannot be easily extruded or molded.

GENERAL DESCRIPTION OF THE INVENTION

The molding compositions of the present invention include processed mineral fiber as a processing aid. The processing aid facilitates the use of higher filler loadings, especially of inorganic filler materials. The use of the processing aid substantially improves the flowability of filled compositions, thereby facilitating easier handling, extruding, pelletizing, and subsequent molding operations. The flowability of filled molding compositions is improved by use of the present processing aid in the range of about 3 to about 20 percent.

Processed mineral fiber is obtained from mineral wool (fiberized blast furnace slag). A processed mineral fiber material produced by Jim Walter Resources, Inc. is aptly suited to use in the present invention. Processed mineral fiber has a diameter ranging from about 1 to about 10 microns and an aspect ratio (length/diameter) of 40 to 60. Physically the particles are about the size of the "o" in the middle of this sentence. Suitable material has a specific gravity of about 2.7 and typically contains about 42.1 percent by weight $SiO_2$; 8.1% $Al_2O_3$; 35.4% CaO; 7.8% MgO; and 6.6% of other inorganics.

Processed mineral fiber has been proposed as a substitute for asbestos in many applications, for example, in phenolics and epoxy gel coats. However, such loadings, in the range of from about 30 to about 50 percent by weight, have not proved acceptable because of surface degradation. It has now been found that processed mineral fiber is useful as a component in filled molding compositions as a processing aid. Amounts of processed mineral fiber of from about 3 to about 20 percent by weight are aptly suited to use. The use of such aid surprisingly allows a high loading of filler material with improved flowability of the composition.

DETAILED DESCRIPTION OF THE INVENTION

The molding compositions of the present invention include a phenol-aldehyde resin component, a processed mineral fiber processing aid and filler material.

The phenol-aldehyde resin component generally comprises from about 15 to about 60 percent by weight of the composition. More preferably, a range of from about 30 to about 50 percent by weight is eminently suited to use. Usually, less than about 15 percent by weight resin does not yield a product having a cohesiveness required for most applications. Usually, more than about 60 percent by weight resin yields a product that does not have acceptable physical properties, e.g. hardness, thermal conductivity, and is not usually economically competitive with compositions containing larger amounts of filler materials. The phenol-aldehyde resin compositions suited to use in the present invention are those known in the art and discussed above. Phenol-formaldehyde is the most common resin type used in industry and is the preferred type for use in the present invention.

The processed mineral fiber processing aid utilized in the present compositions may effectively be utilized in a range of from about 3 to about 20 percent by weight and, within this range, a range of from about 5 to about 15 percent by weight and, more preferably, from about 6 to about 12 percent by weight is suited to use. Amounts of less than about 3 percent by weight do not demonstrate a useful improvement in flowability of the composition. Generally, amounts greater than about 20 percent by weight yield a product that has poor moldability and degraded physical properties.

The filler materials utilized in the present molding compositions are those utilized in the prior art and discussed in the foregoing description relating to filler materials. In recent years, the undesirability of asbestos as a filler material has become a factor. Although asbestos may be utilized as a filler material in the present invention, it is not preferred. One of the advantages of the present compositions is that high loadings of filler materials, which are asbestos substitutes, are made possible.

The compositions of the present invention are produced by preparing a mixture of a phenol-aldehyde resin in finely divided form, mixing the processing aid and filler materials, preferably also in finely divided form, extruding the mixture to form a nodule or pellet product.

The phenol-aldehyde resin may be a one- or a two-stage resin. If less than one mole of the aldehyde is reacted per mole of phenol, the resin is commonly called a novolac, or two-stage resin. A novolac mixture is processed by grinding and blending with an external cross-linking agent, such as hexamethylenetetramine to produce a thermosettable resin composition that becomes infusible at elevated temperatures. Generally, the range of aldehyde to phenol in a novolac resin is between about 0.5 and about 0.9 mole of aldehyde per mole of phenol, and, more preferably, the range is between about 0.6 and about 0.8.

If more than one mole of aldehyde per mole of phenol is utilized, a one-stage, or resole, resin is produced. Such mixtures become infusible by exposure to elevated temperatures. Generally, the mole ratio of aldehyde to phenol in this type of resin is between about 1.1 to about 3.0, and, more preferably, between about 1.5 and about 2.5.

Although novolac resins are preferred for use in the present invention, resole resins are suited, and mixtures of one- and two-stage resins may be utilized.

The resin component is prepared in finely divided form and admixed with the processing aid and filler material, also preferably in finely divided form. The mixture may then be extruded, suitably by extruding the mixture through the orifice of a screw extruder to form nodules by comminuting the product. Generally, the extrusion equipment is heated to a temperature sufficient to melt the resin without initiating setting. A temperature of about 290° F. or less is suited, and temperatures between about 200° F. and 240° F. are preferred. In some extrusion processes, a cooling of the extruded product is utilized to prevent setting of the resin and agglomeration of the nodules. A suitable lubricant, such as zinc stearate, may then be blended with the extrudate to improve the moldability on processing equipment, such as screw preheating or screw injection equipment, as has been common practice in industry since before 1970.

The following examples are illustrative of, and are not to be construed as limiting to, the present invention. Unless otherwise noted in the examples, parts and percent are both by weight.

EXAMPLE I—CONTROL

A phenol-formaldehyde resin was prepared by reacting about 0.7 moles of formaldehyde per mole of phenol utilizing an acid catalyst. The mixture was subsequently neutralized and allowed to solidify. The solid novolac product was then ground to a fine particle size and blended with about 17 percent of hexamethylenetetramine to produce the resin component. About 40 parts of the resin component was then mixed with 4.5 parts of wood flour, 33.3 parts of talc, 13.5 parts of cotton flock, and about 2.0 parts of dye and other components, e.g., carbon or wax.

The mixture was fed into a screw extruder at about 220° F. The mixture was extruded with some difficulty. The separate streams or rods of extruded material gnarled together preventing further processing.

This example is shown in tabular form in Table I and Example I.

EXAMPLE II

The novolac resin component and filler materials of Example I were again used, and, in addition, 6.7 parts of processed mineral fibers were added. The components were blended and, similar to Example I, were fed into a screw-type extruder. The mixture advanced without difficulty through the screw and was extruded through a die orifice of about ⅛" in diameter. The extruded material, in the form of rods, was then comminuted into nodules of about ¼" in length. The nodules were cooled rapidly to prevent setting of the resin and to keep the nodules from coagulating together. The product was essentially uniform in size and comprised of individual nodules, making the product easily pourable for filling and loading operations.

Example II is shown in tabular form in Table I as Example II. Examples III to V were carried out in a manner similar to Examples I and II.

TABLE I

| COMPONENTS | EXAMPLES | | | | |
|---|---|---|---|---|---|
| | I | II | III | IV | V |
| Phenol-formaldehyde resin | 40.0 | 40.0 | 40.0 | 40.0 | 35.0 |
| Wood Flour | 4.5 | 4.5 | — | — | — |
| Talc | 33.3 | 33.3 | 25.0 | — | — |
| Cotton Flock | 13.5 | 13.5 | 10.0 | 10.0 | 10.0 |
| Glass Fiber | — | — | 10.0 | 10.0 | 20.0 |
| Wollastonite | — | — | — | 25.0 | 20.0 |
| Other Additives | 2.0 | 2.0 | 5.0 | 5.0 | 5.0 |
| Processed Mineral Fiber | 0.0 | 6.7 | 10.0 | 10.0 | 10.0 |

The molding compositions of this invention may be suitably employed in a variety of product applications depending on the various characteristics desired. For instance, the composition of Example II is a modular arcresistant material especially useful for electrical applications. Similarly, the composition of Example III is a glass-mineral filled material with improved electrical properties especially suited for use on circuit breakers and related electrical equipment. The composition of Example IV is a high strength glass-mineral filled material especially suited for applications in automobile transmission torque converters, thrust washers, commutators, and applications which require high shear strength. Finally, the composition of Example V is a high strength, high gravity glass-mineral filled material useful for various automotive applications, such as disc brake backing plates.

Although the present invention has been described with certain specific embodiments, it is to be understood that modifications and variations may be made without departing from the spirit and scope of the invention, as those of ordinary skill in the art will readily understand. Such modifications and variations are considered to be within the purview and scope of the appended claims.

What is claimed is:

1. A phenol-aldehyde resin molding composition capable of forming a nodular or flake product comprising from about 15 to about 60 percent by weight phenol-aldehyde resin, from about 3 to about 20 percent by weight of processed mineral fiber processing aid, and from about 20 to about 70 percent by weight filler material.

2. The composition of claim 1 wherein the phenol-aldehyde resin is phenol-formaldehyde.

3. The composition of claim 1 wherein the filler material is predominantly inorganic.

4. The composition of claim 1 wherein the processed mineral fiber is added in an amount between about 5 and about 15 percent by weight.

5. A process of producing phenol-aldehyde molding composition comprising the steps of:
   (a) preparing the composition of claim 1 in finely divided form,
   (b) extruding the prepared composition,
   (c) comminuting the extruded product, and,
   (d) recovering a product substantially uniform in size.

6. A nodular product produced by the process of claim 5.

7. A flake product produced by the process of claim 5.

8. A molded article produced from the composition of claim 1.

9. The composition of claim 2 wherein the processed mineral fiber processing aid has a diameter in the range of about 1 to about 10 microns.

10. The composition of claim 9 wherein the processed mineral fiber processing aid has an aspect ratio of 40 to 60.

* * * * *